(12) United States Patent
Hameed et al.

(10) Patent No.: US 10,164,931 B2
(45) Date of Patent: Dec. 25, 2018

(54) CONTENT PERSONALIZATION BASED ON ATTRIBUTES OF MEMBERS OF A SOCIAL NETWORKING SERVICE

(71) Applicant: Microsoft Technology Licensing, LLC, Redmond, WA (US)

(72) Inventors: Saad Hameed, Fremont, CA (US); Steven Curtis McClung, Fremont, CA (US); Anja Dinah Neupert, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 374 days.

(21) Appl. No.: 14/673,812

(22) Filed: Mar. 30, 2015

(65) Prior Publication Data
US 2016/0294761 A1   Oct. 6, 2016

(51) Int. Cl.
G06F 15/16 (2006.01)
H04L 12/58 (2006.01)
H04L 29/08 (2006.01)
G06F 17/22 (2006.01)

(52) U.S. Cl.
CPC .......... *H04L 51/32* (2013.01); *G06F 17/2247* (2013.01); *G06F 17/2288* (2013.01); *H04L 67/02* (2013.01); *H04L 67/22* (2013.01); *H04L 67/306* (2013.01)

(58) Field of Classification Search
CPC ......... H04L 51/32; H04L 67/02; H04L 67/22; H04L 67/306; G06F 17/2288; G06F 17/2247
USPC ................ 709/204, 250, 219, 201, 217, 248
See application file for complete search history.

(56) References Cited

U.S. PATENT DOCUMENTS

| | | | | |
|---|---|---|---|---|
| 8,250,145 B2* | 8/2012 | Zuckerberg | ............ | G06Q 30/02 705/80 |
| 2007/0150603 A1* | 6/2007 | Crull | .................. | G06F 17/3089 709/227 |
| 2012/0110469 A1* | 5/2012 | Magarshak | ............. | H04L 9/321 715/747 |
| 2013/0073632 A1* | 3/2013 | Fedorov | ............... | G06Q 10/101 709/205 |

* cited by examiner

*Primary Examiner* — Yves Dalencourt
*Assistant Examiner* — Sahera Halim
(74) *Attorney, Agent, or Firm* — Schwegman Lundberg & Woessner, P.A.

(57) ABSTRACT

A machine may be configured to personalize the content presented to a member of the social networking service visiting a web site. For example, the machine accesses a member identifier associated with a visitor to a web site. The member identifier identifies a particular member of a social networking service. The machine accesses member data associated with the member identifier in a database associated with the social networking service. The machine identifies one or more attributes associated with the particular member based on the member data. The machine selects an item of content for presentation to the particular member visiting the web site based on the one or more attributes associated with the particular member. The machine causes presentation of the item of content in a user interface of a widget included in the web site.

20 Claims, 11 Drawing Sheets

CONTENT PERSONALIZATION BASED ON ATTRIBUTES OF MEMBERS OF A SOCIAL NETWORKING SERVICE

TECHNICAL FIELD

The present application relates generally to the processing of data, and, in various example embodiments, to systems, methods, and computer program products for personalization of content presented to a member of the social networking service (also "SNS") visiting a web site based on an attribute associated with the member of the SNS.

BACKGROUND

The web site of a company may be an important source of information about the company. A visitor to a company's web site may read about various aspects of the company, such as solutions (e.g., products or services) offered by the company, jobs available at the company, etc. The information presented on the company's web site may contribute to persuading the visitors to the web site to purchase the company's products or services. Because of the role that the web site content plays in promoting the image of the company and marketing its products or services, the managers of the company strive to publish high-quality content on the company's web site.

Generally, the informational content displayed on a company's web site is generated within the company. However, certain company procedures (e.g., technical, editorial, or legal) pertaining to publishing informational content on the company's web site may introduce unwanted delays in the publishing process.

BRIEF DESCRIPTION OF THE DRAWINGS

Some embodiments are illustrated by way of example and not limitation in the figures of the accompanying drawings, in which.

DETAILED DESCRIPTION

Figure 1:
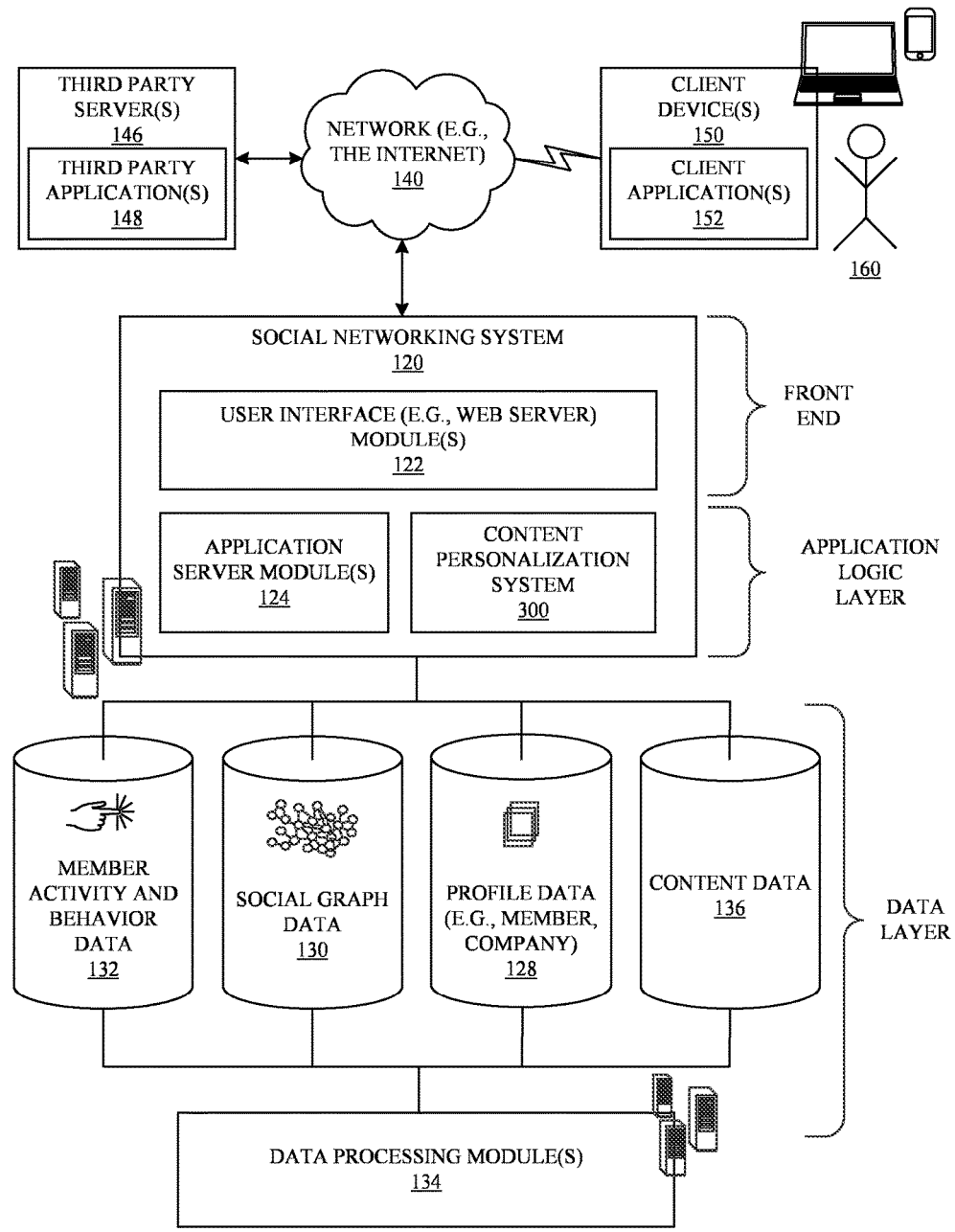
FIG. 1 is a network diagram illustrating a client-server system, according to some example embodiments.

Example methods and systems for personalization of content presented to a member of the social networking service (also "SNS") visiting a web site based on an attribute associated with the member of the SNS are described. In the following description, for purposes of explanation, numerous specific details are set forth to provide a thorough understanding of example embodiments. It will be evident to one skilled in the art, however, that the present subject matter may be practiced without these specific details. Furthermore, unless explicitly stated otherwise, components and functions are optional and may be combined or subdivided, and operations may vary in sequence or be combined or subdivided.

The marketing organizations of numerous companies are tasked with generating content that promote the companies and their products or services. The items of content may include articles, blog entries, commentary, brochures, online advertising, news pieces, etc. To be persuasive, the content must be both of high quality and relevant to the consumer of content (e.g., reader, viewer, listener, etc.). The consumer of content may be a potential buyer or an actual buyer of one or more products or services offered by a company. In some example embodiments, the content consumer is a member of a social networking service (also "SNS"), such as LinkedIn®. Because content generated within the company for publication on the company's web site may undergo a thorough editorial and legal review, and the web site including the content may undergo a number of technical (e.g., quality assurance) tests, delays may be introduced in the content publishing process. A need may arise to facilitate the publication on the company's web site of high-quality relevant content that pertains to the company but that has been generated externally to the company.

Generally, a content consumer (also "visitor to a web site" or "user") finds content to be relevant when the information addresses topics and issues of interest to the content consumer. Thus, understanding who the content consumers are, where they are located, what they do, what companies they work for, what they are passionate about, what actions they engaged in, what content they already consumed, etc. may assist in personalizing content for the content consumers and facilitating a more focused presentation of content that is relevant to the content consumers.

In some example embodiments, a content personalization system identifies items of content (generated within the company or outside the company) that pertain to the company and that are relevant to a member of the SNS visiting the web site and causes presentation of the identified items of content in a user interface of a widget included in the web site visited by the member of the SNS. For example, the content personalization system may access a member identifier associated with a visitor to a web site. The member identifier may identify a particular member of a social networking service (SNS). The content personalization system may also access member data (e.g., profile data, social graph data, member activity and behavior data, etc.) associated with the member identifier in a database of the SNS. The content personalization system may identify one or more attributes associated with the particular member based on the member data. Examples of attributes associated with the particular member may include a job title, a company name of the company that employs the particular member, a seniority level, whether the particular member is a decision maker, an indicator of a type of content that the particular member has consumed, etc. The content personalization system may further select an item of content for presentation to the particular member visiting the web site based on the one or more attributes associated with the particular member. Finally, the content personalization system may cause presentation of the item of content in a user interface of a widget included in the web site.

The widget may be a client of the content personalization system. The widget, in some example embodiments, is configured to identify a cookie associated with a browser application utilized by the particular member of the SNS to access the web site. A cookie (also called HTTP cookie, web cookie, Internet cookie, or browser cookie) is a small piece of data sent from a web site and stored in a user's web browser while the user is browsing that web site. Every time the user loads the web site, the browser sends the cookie back to the web server that delivers web pages of the web site to notify the web server of the user's previous activity. Cookies were designed to be a mechanism for web sites to record stateful information (e.g., items in a shopping cart) or to record the user's browsing activity (e.g., clicking particular buttons, logging in, or recording which pages were visited by the user as far back as months or years ago).

The cookie may include a hash value that uniquely identifies the visitor to the web site (e.g., the particular member). The widget may also be configured to transmit a communication from a device of the particular member utilized to access the web site to the content personalization system. In some instances, the communication may be transmitted to the content personalization system via a web server that delivers web pages of the web site.

In some example embodiments, upon receiving the communication that includes the cookie from the web server that delivers web pages of the web site, the content personalization system identifies the hash value included in the cookie. The content personalization system may access member data associated with one or more members of the SNS and may match the hash value to the member identifier that identifies the particular member of the SNS based on the member data associated with the one or more members.

Consistent with some example embodiments, the communication from the web server further includes an indication of a particular web page of the web site being viewed by the particular member. This may serve as indication of the particular member's interest with respect to the company's web site or the company itself. For example, the visitor selecting to view a product page indicates that the visitor is interested in the product. Similarly, the visitor selecting to view a careers page indicates that the visitor in interested in learning about the careers available at the company. The content personalization system may further base the selection of the item of content for presentation to the particular member on the particular web page.

In some example embodiments, the content personalization system may access one or more items of content and categorize the one or more items of content into one or more categories of content items based on one or more profile criteria associated with members of the SNS and one or more firmographics criteria (e.g., name of a company, industry, company size, company location, or other attributes) associated with a company.

The content personalization system may select and deliver content (e.g., marketing content, marketing output, etc.) to the user to increase the user's engagement (e.g., readiness to buy a product or service) in a buying cycle. The selection of the item of content (e.g., the item of digital content) may be based on big data analytics of data pertaining to a plurality of users (e.g., the potential buyer, actual buyers of the selected or other products or services, etc.), business data pertaining to the seller of the product or service, or both. In some instances, the engagement accelerating system may remove the personally identifiable information (PII) from the user data pertaining to the plurality of the users before the user data is analyzed by the engagement accelerating system. In certain example embodiments, the user data analyzed by the engagement accelerating system is stored without the PII in one or more databases accessed by the engagement accelerating system.

The content personalization system may determine the level of engagement of a user (e.g., a potential buyer) with the company (e.g., with the products or services sold by the company, marketing output or news feeds generated by or for by the company, the employees of by the company, etc.) and may select items of content for the user based on the level of engagement of the user.

The content personalization system may also determine the level of awareness of the user with respect to one or more products or services offered by the company. In some example embodiments, the content personalization system determines the product or service of the one or more products or services that should be promoted (e.g., offered for sale) to the user based on the level of awareness of the user with respect to one or more products or services. The content personalization system may then identify an item of content to be communicated to the user based on the level of awareness of the user with regards to the product or service the user might be interested in. In certain example embodiments, the content personalization system may identify the optimal item of content to be presented to the particular user based on a buying cycle phase that the user is associated with.

An example method and system for personalization of content presented to a member of the SNS visiting a web site may be implemented in the context of the client-server system illustrated in FIG. 1. As illustrated in FIG. 1, the content personalization system 300 is part of the social networking system 120. As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG.

1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, application programming interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone).

For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of a social graph. In some example embodiments, a "social graph" is a mechanism used by an online social networking service (e.g., provided by the social networking system 120) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. Of course, with various alternative embodiments, any number of other entities may be included in the social graph, and as such, various other databases may be used to store data corresponding to other entities.

Consistent with some embodiments, when a person initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social networking service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130.

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services, and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. In some example embodiments, the search engine indexes a plurality of content items based on words included in the plurality of content items. The indexing of the plurality of content items may facilitate the selecting, by the content personalization system 300, of an item of content for presentation to a particular member visiting a web site based on member attributes. Of course, other applications and services may be separately embodied in their own application server modules 124. As illustrated in FIG. 1, social networking system 120 may include the content personalization system 300, which is described in more detail below.

Further, as shown in FIG. 1, a data processing module 134 may be used with a variety of applications, services, and features of the social networking system 120. The data processing module 134 may periodically access one or more of the databases 128, 130, 132, or 136, process (e.g., execute batch process jobs to analyze or mine) profile data, social graph data, member activity and behavior data, or content data, and generate analysis results based on the analysis of the respective data. The data processing module 134 may operate offline. According to some example embodiments, the data processing module 134 operates as part of the social networking system 120. Consistent with other example embodiments, the data processing module 134 operates in a separate system external to the social networking system 120. In some example embodiments, the data processing module 134 may include multiple servers, such as Hadoop servers for processing large data sets. The data processing module 134 may process data in real time, according to a schedule, automatically, or on demand.

In some example embodiments, the data processing modules 134 may perform an analysis of profile data associated with a plurality of members of the social networking service. For example, the data processing module 134 may analyze the data pertaining to the behavior of a user (e.g., website pages viewed, online content consumed by the user, number of days during a period of time that the user visited a website, etc.) and determine the engagement level of the user in a buying cycle. The results of the analyses performed by the data processing module 134 may be stored for further use, in one or more of the databases 128, 130, 132, or 136, or in another database.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
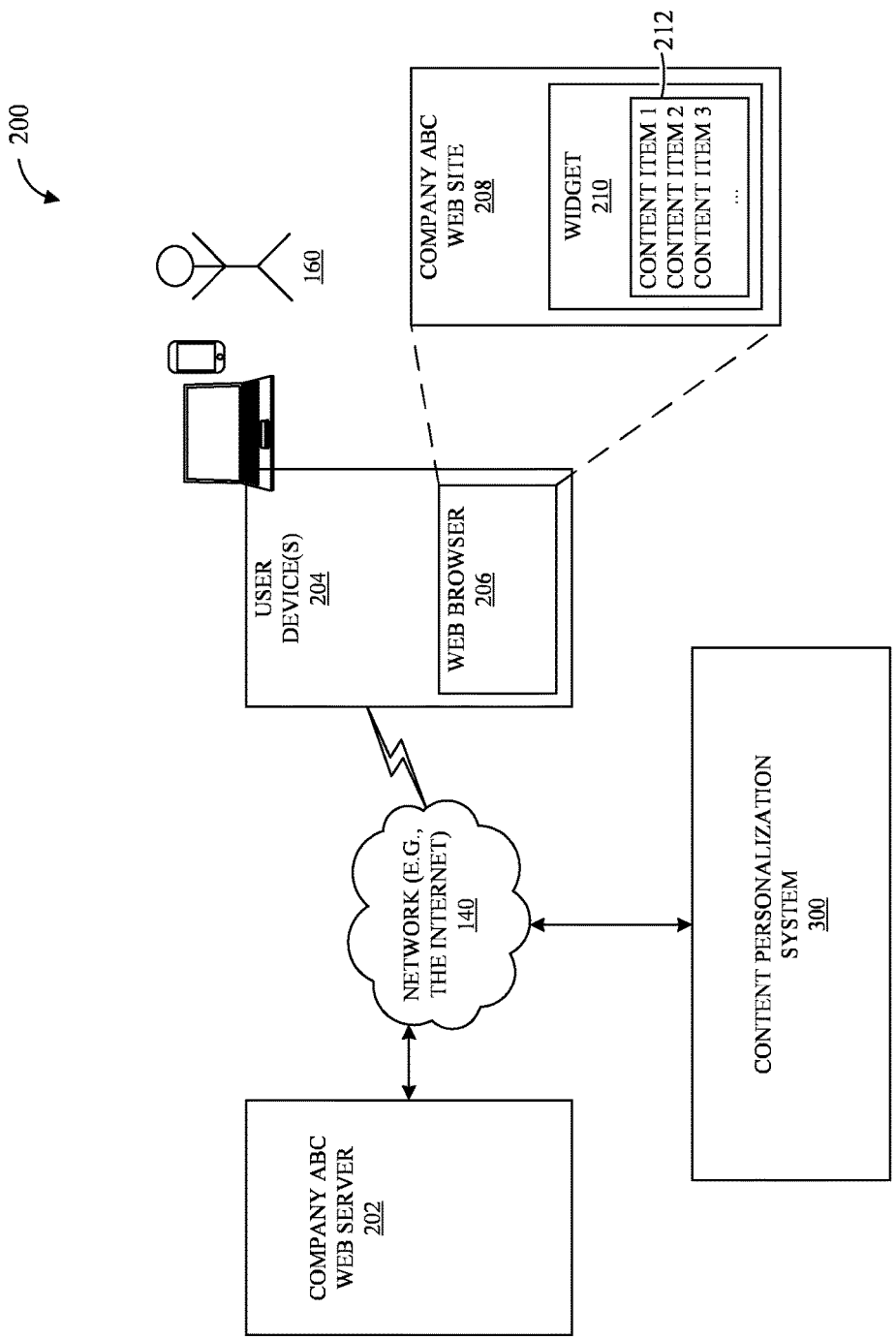
FIG. 2 is a diagram that illustrating a client-server system, according to some example embodiments.

FIG. 2 is a diagram that illustrating a client-server system 200, according to some example embodiments. As shown in FIG. 2, the user 160 may utilize a user device 204 to connect via the network 140 to company ABC web server 202. For example, the user 160, with the use of a web browser application 206 installed on the user device 204, may visit the company ABC web site 208 provided by the company ABC web server 202. The company ABC web site 208 may be displayed in the web browser 206 and may include a widget 210. The widget 210 may display one or more content items 212.

In some example embodiments, based on the user 160 selecting to view the company ABC web site 208 (e.g., by entering a Uniform Resource Locator (URL) of the company ABC web site 208 in an address bar of the web browser 206), the user device 204 transmits a first communication to the company ABC web server 202. The first communication may include a cookie. The company ABC web server 202 transmits a second communication to the content personalization system. The second communication may include the cookie received from the web browser 206. Upon receiving the second communication from the company ABC web server 202, the content personalization system 300 identifies a hash value included in the cookie. The hash value may uniquely identify the visitor to the web site. The content personalization system 300 may also access member data associated with one or more members of the SNS. The content personalization system 300 may then match the hash value to a member identifier that identifies the particular member of the SNS (e.g., the user 160) based on the member data associated with the one or more members.

The content personalization system 300 accesses member data associated with the member identifier (e.g., the member identifier (ID) of the user 160) in a database of the SNS. Examples of member data include profile data 128, social graph data 130, or member activity and behavior data 130. The content personalization system 300 identifies one or more attributes associated with the particular member (e.g., the user 160) based on the member data. The content personalization system 300 then selects an item of content (e.g., from content database 136) for presentation to the particular member visiting the web site (e.g., the user 160) based on the one or more attributes associated with the particular member (e.g., the user 160). The content personalization system 300 causes presentation of the item of content in a user interface of the widget 210 included in the company ABC web site 208.

Figure 3:
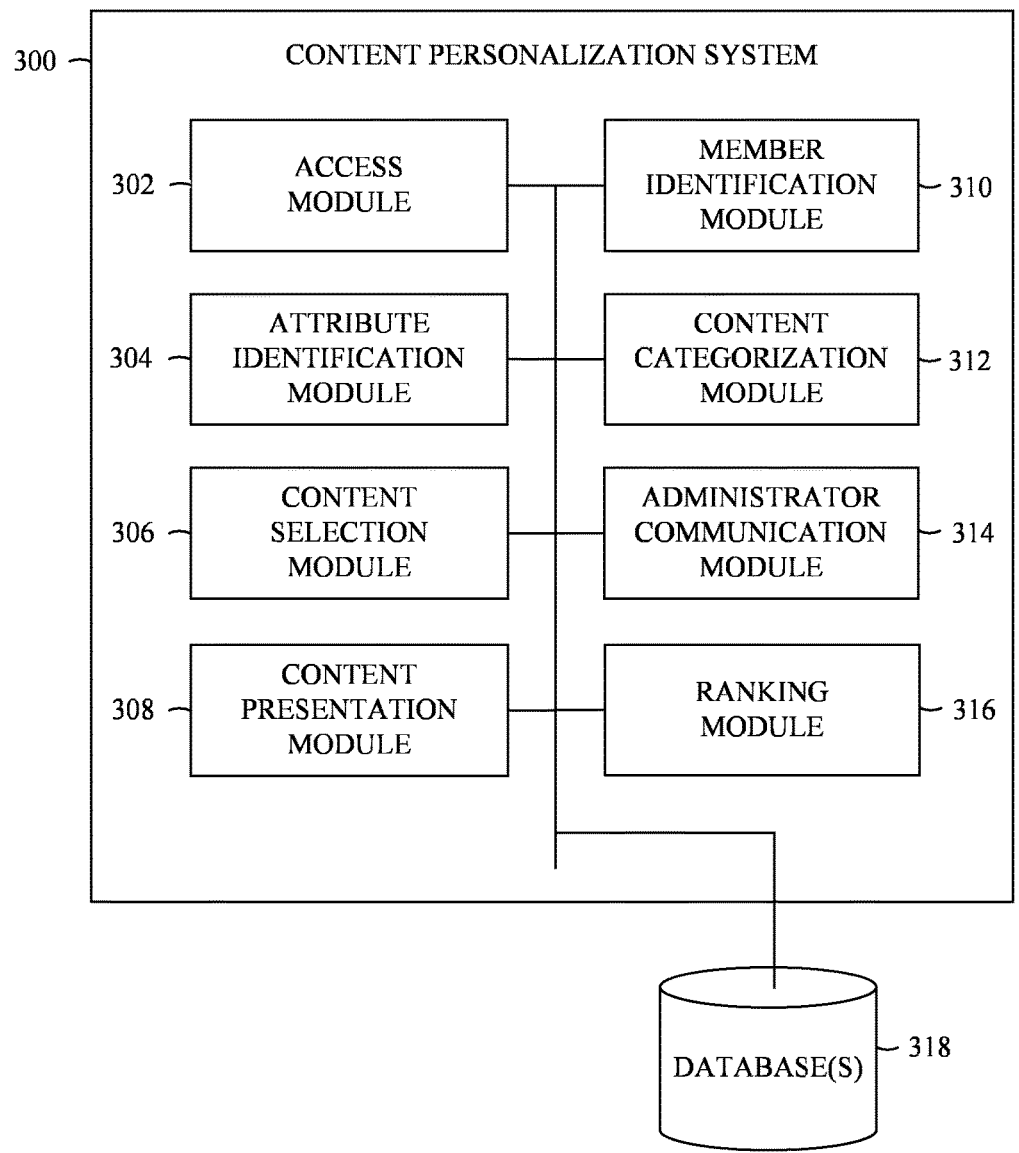
FIG. 3 is a block diagram illustrating components of a content personalization system, according to some example embodiments.

FIG. 3 is a block diagram illustrating components of the content personalization system 300, according to some example embodiments. As shown in FIG. 3, the content personalization system 300 may include an access module 302, an attribute identification module 304, a content selection module 306, a content presentation module 308, a member identification module 310, a content categorization module 312, an administrator communication module 314, and a ranking module 316, all configured to communicate with each other (e.g., via a bus, shared memory, or a switch).

The access module 302 may access a member identifier associated with a visitor to a web site. The member identifier identifies a particular member of a social networking service. The access module 302 may also access member data associated with the member identifier in a database associated with the social networking service.

The attribute identification module 304 may identify one or more attributes associated with the particular member based on the member data. The content selection module 306 may select an item of content for presentation to the particular member visiting the web site based on the one or more attributes associated with the particular member. The content presentation module 308 may cause presentation of the item of content in a user interface of a widget included in the web site.

The member identification module 310 may receive a communication from a web server that delivers web pages of the web site. The communication may include a cookie. The member identification module 310 may also identify a hash value included in the cookie, the hash value uniquely identifying the visitor to the web site. The member identification module 310 may also access member data associated with one or more members of the social networking service. Finally, the member identification module 310 may match the hash value to the member identifier that identifies the particular member of the social networking service based on the member data associated with the one or more members.

The content categorization module 312 may access one or more items of content including the item of content. The content categorization module 312 may categorize the one or more items of content into one or more categories of content items based on one or more profile criteria associated with members of the social network service and one or more firmographics criteria associated with a company.

The administrator communication module 314 may cause presentation of one or more profile criteria associated with members of the social network service and one or more firmographics criteria associated with a company in a further user interface of a device associated with an administrator. The administrator communication module 314 may also receive indicators of the one or more profile criteria and one or more firmographics criteria from the device. The one or more profile criteria and one or more firmographics criteria may be selected by the administrator. The categorizing the one or more items of content into one or more categories of content items may be based on the selected one or more profile criteria and one or more firmographics criteria.

The ranking module 316 may rank a plurality of items of content including the item of content according to a rule of content ranking. The ranking results in a list of ranked items of content. The ranking module 316 may also identify a number of items of content in a top of the list of items of content according to a content presentation rule. The causing of the presentation of the item of content in the user interface includes causing a display of the number of items of content in the user interface based on the ranking of the plurality of items of content.

To perform one or more of its functionalities, the content personalization system 300 may communicate with one or more other systems. For example, a search engine may access a plurality of items of content and may index the plurality of items of content. The indexing of the items of content may facilitate one or more functionalities of the content personalization system 300.

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, so as to allow information to be passed between the applications so as to allow the applications to share and access common data. Furthermore, the modules may access one or more databases 316 (e.g., database 128, database 130, database 132, or database 136).

Figure 4:
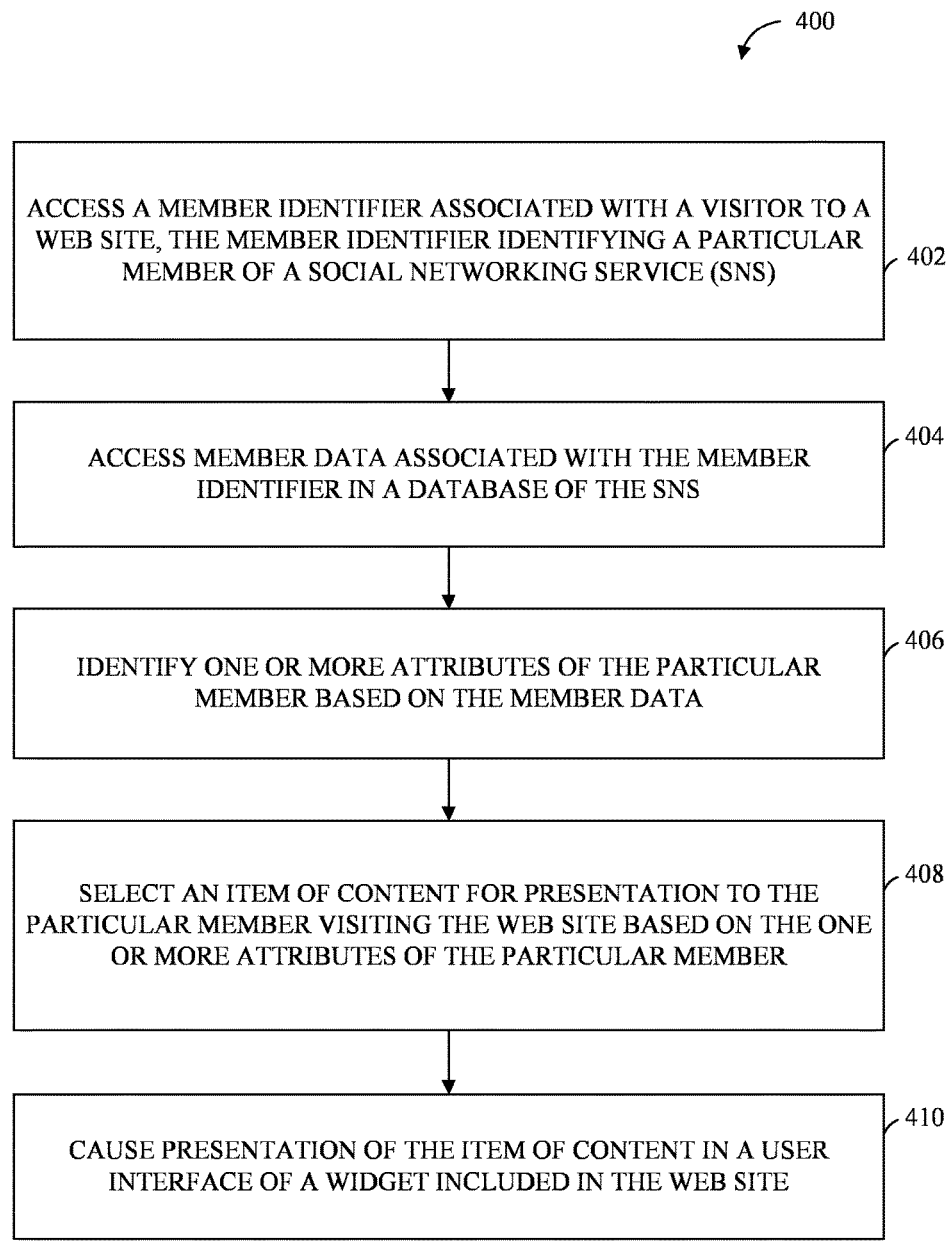
FIG. 4 is a flowchart illustrating a method of personalization of content presented to a member of the SNS visiting a web site, according to some example embodiments.

FIGS. 4-9 are flowcharts illustrating a method of personalization of content presented to a member of the SNS visiting a web site, according to some example embodiments. Operations in the method 400 illustrated in FIG. 4 may be performed using modules described above with respect to FIG. 3. As shown in FIG. 4, the method 400 may include one or more of operations 402, 404, 406, 408, and 410.

At method operation 402, the access module 302 accesses (e.g., receives) a member identifier associated with a visitor to a web site. The member identifier identifies a particular member of a social networking service At method operation 404, the access module 302 accesses member data associated with the member identifier in a database associated with the social networking service. The member data may include at least one of profile data, social graph data, or member activity and behavior data.

At method operation 406, the attribute identification module 304 identifies one or more attributes associated with the particular member based on the member data. The identifying of the one or more attributes associated with the particular member may be performed according to a rule of attribute identification. Examples of attributes associated with a member of the SNS include a title, a geographic location, a decision making authority, a seniority level, a type of preferred content, etc. The attributes associated with a member of the SNS may be stored in a database associated with the SNS as name-value pairs (e.g., "title: IP lawyer," "geo location: USA," "preferred content: patent," etc.), where "name" is the name of the attribute and "value" is the value taken by the particular attribute. An example rule of attribute identification is "Identify the value in the 'title' name-value pair associated with member identifier JS12345."

At method operation 408, the content selection module 306 selects an item of content for presentation to the particular member visiting the web site based on the one or more attributes associated with the particular member. The selecting of the item of content for presentation to the particular member visiting the web site may be performed according to a rule of content selection. An example rule of content selection is "Select a content item that is tagged with the tag 'IP lawyer.'" The tag "IP lawyer" corresponds to the value of the "title" attribute associated with the particular member.

At method operation 410, the content presentation module 308 causes presentation of the item of content in a user interface of a widget included in the web site.

Further details with respect to the method operations of the method 600 are described below with respect to FIGS. 5-9.

Figure 5:
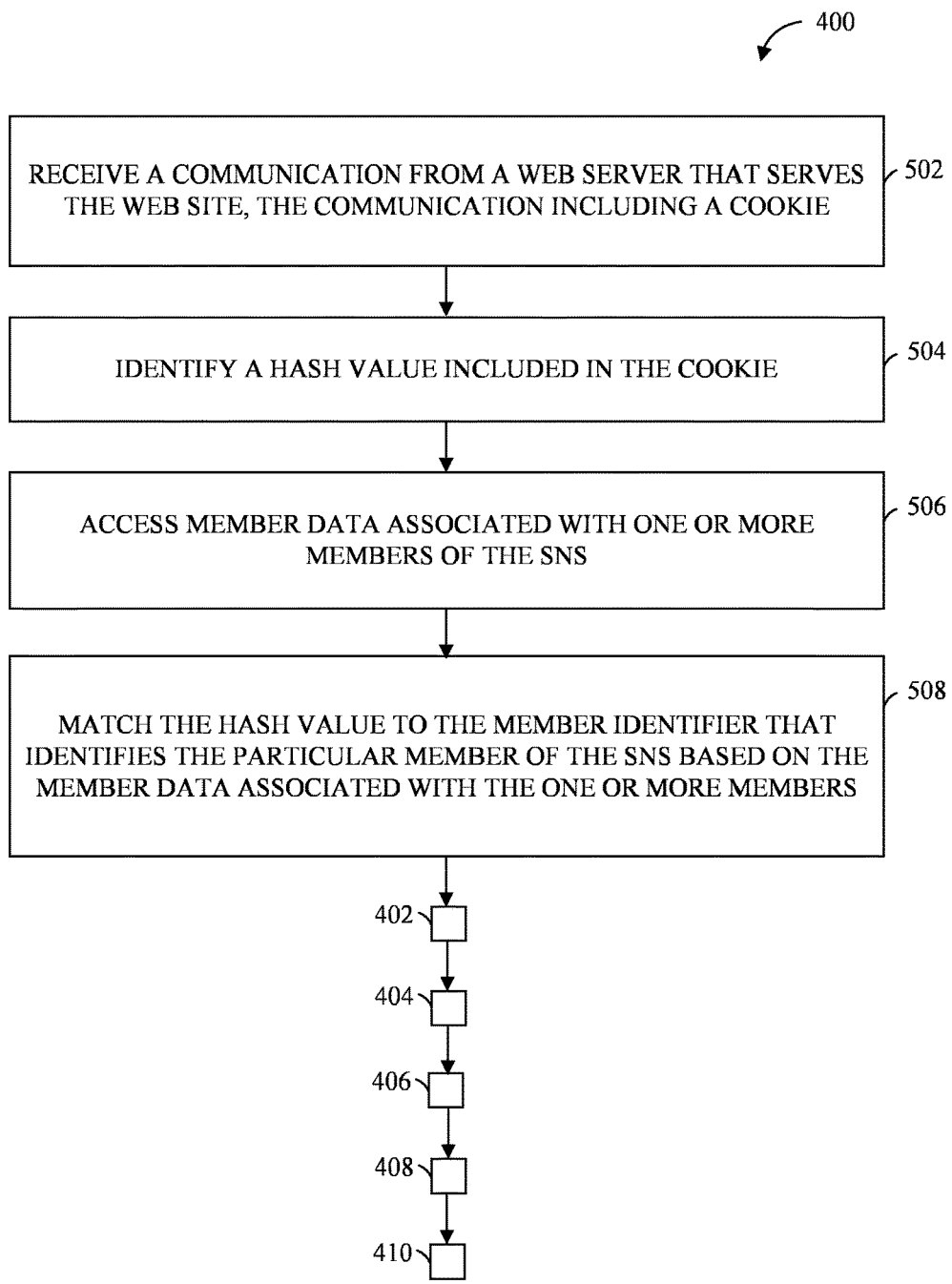
FIG. 5 is a flowchart illustrating a method of personalization of content presented to a member of the SNS visiting a web site, and represents additional steps of the method illustrated in FIG. 4, according to some example embodiments.

As shown in FIG. 5, the method 400 may include one or more of method operations 502, 504, 506, and 508, according to some example embodiments. Method operation 502 may be performed before method operation 402, in which the access module 302 accesses (e.g., receives) a member identifier associated with a visitor to a web site.

At method operation 502, the member identification module 310 receives a communication from a web server that delivers web pages of the web site.

At method operation 504, the member identification module 310 identifies a hash value included in the cookie. The hash value uniquely identifies the visitor to the web site.

At method operation 504, the member identification module 310 accesses member data associated with one or more members of the social networking service. The member data may be stored in one or more of the databases 128, 130, or 132.

At method operation 504, the member identification module 310 matches the hash value to the member identifier that identifies the particular member of the social networking service based on the member data associated with the one or more members.

The communication includes a cookie. In some example embodiments, the communication from the web server further includes an indication of a particular web page of the web site being viewed by the particular member. The selecting of the item of content for presentation to the particular member may be further based on the particular web page.

Figure 6:
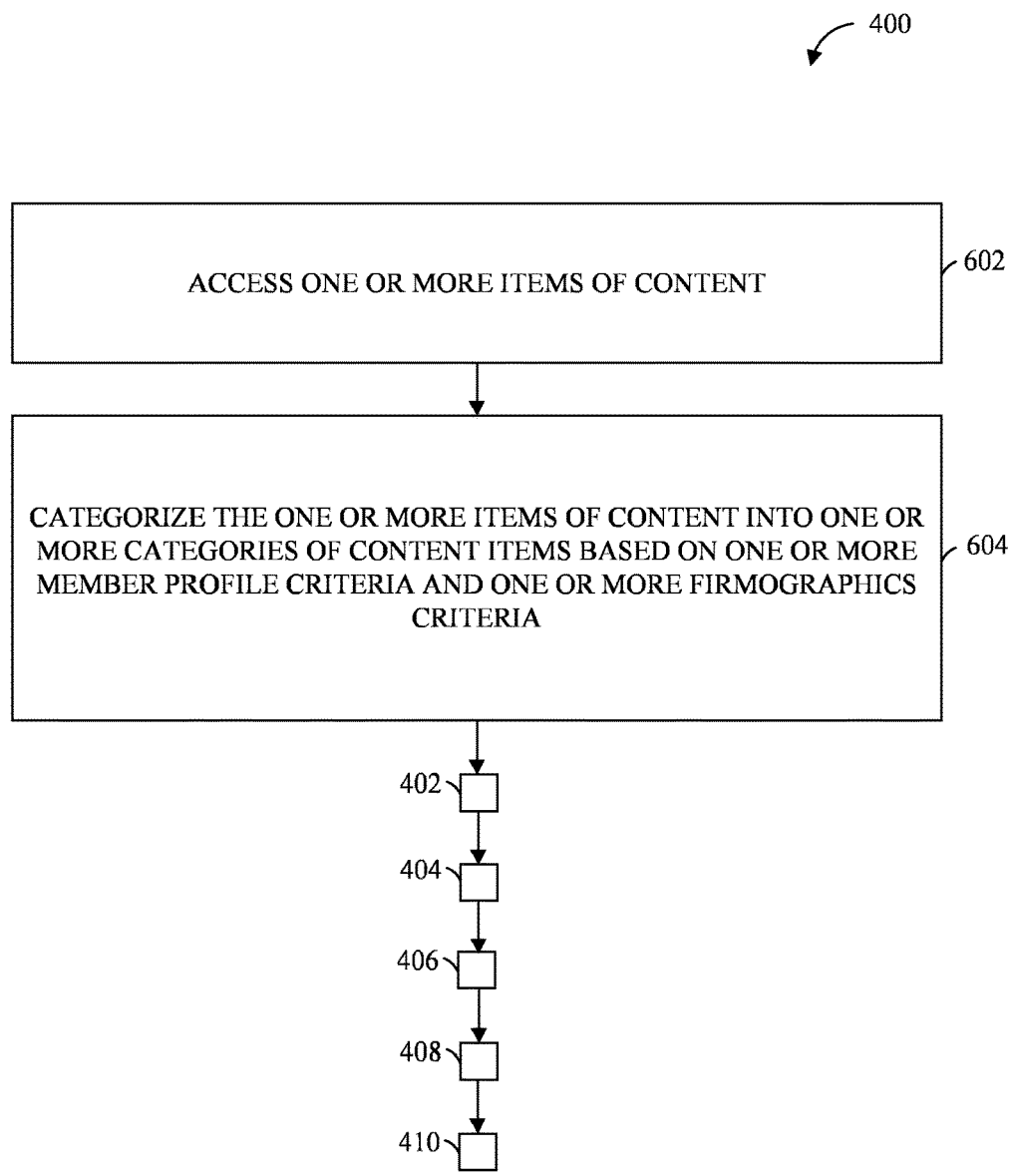
FIG. 6 is a flowchart illustrating a method of personalization of content presented to a member of the SNS visiting a web site, and represents additional steps of the method illustrated in FIG. 4, according to some example embodiments.

As shown in FIG. 6, the method 400 may include one or more of method operations 602 and 604, according to some example embodiments. Method operation 602 may be performed before method operation 402, in which the access module 302 accesses (e.g., receives) a member identifier associated with a visitor to a web site. At method operation 602, the content categorization module 312 accesses one or more items of content including the item of content.

At method operation 604, the content categorization module 312 categorizes the one or more items of content into one or more categories of content items based on one or more profile criteria associated with members of the social network service and one or more firmographics criteria associated with a company. Example categories of content items include "Category 1: IP lawyer, Adobe" and "Category 2: Software Engineer, LinkedIn."

Figure 7:
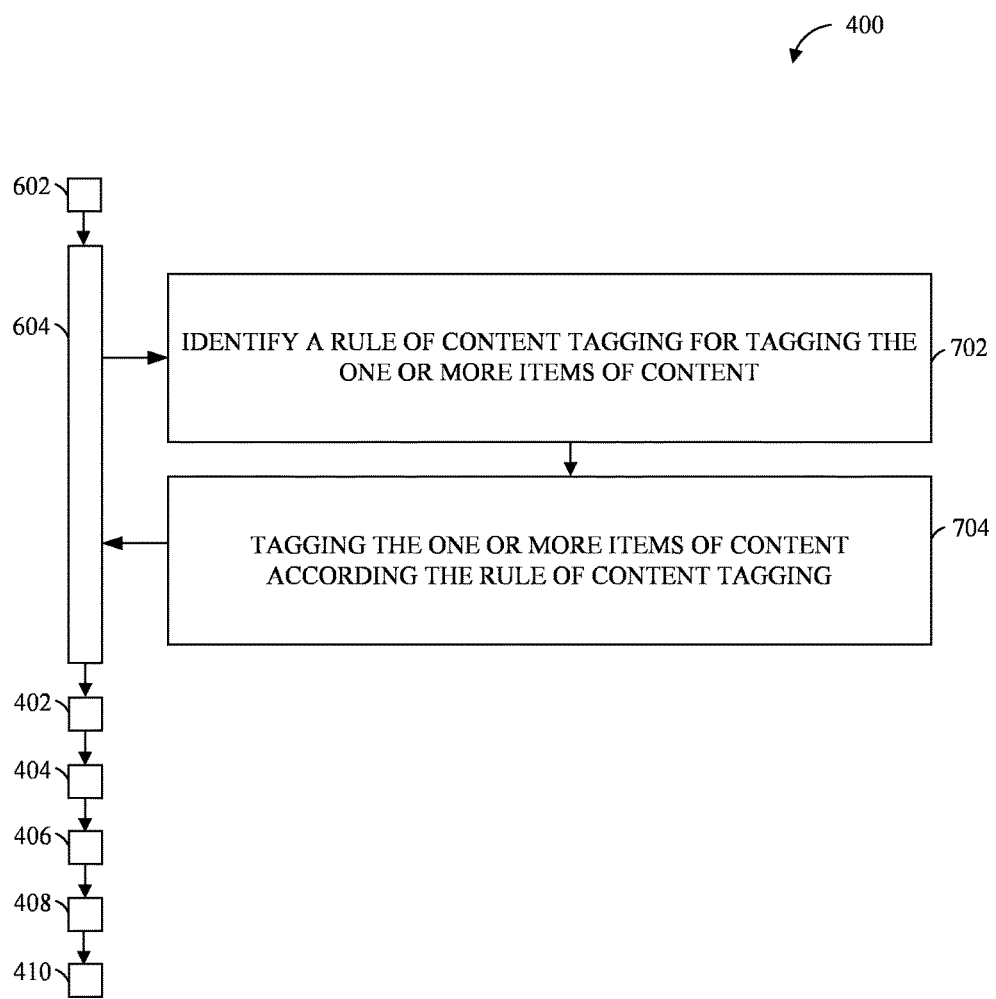
FIG. 7 is a flowchart illustrating a method of personalization of content presented to a member of the SNS visiting a web site, and represents step 604 of the method illustrated in FIG. 6 in more detail, according to some example embodiments.

As shown in FIG. 7, the method 600 may include one or more of method operations 702 and 704, according to some example embodiments. Method operation 702 may be performed as part (e.g., a precursor task, a subroutine, or a portion) of method operation 604, in which the content categorization module 312 categorizes the one or more items of content into one or more categories of content items.

At method operation 702, the content categorization module 312 identifies a rule of content tagging for tagging the one or more items of content. Example rules of content tagging include "Rule 1: parse the item of content and tag the item of content with 'Adobe' if the phrase 'Adobe' appears in the item of content;" and "Rule 2: parse the item of content and tag the item of content with 'IP lawyer' if at least one of the following words appears in the item of content: 'patent,' 'copyright,' 'USPTO,' or 'trade secret.'"

Method operation 704 may be performed after method operation 702. At method operation 702, the content categorization module 312 tags the one or more items of content according the rule of content tagging. The tagging results in one or more tags being associated with the one or more items of content.

Figure 8:
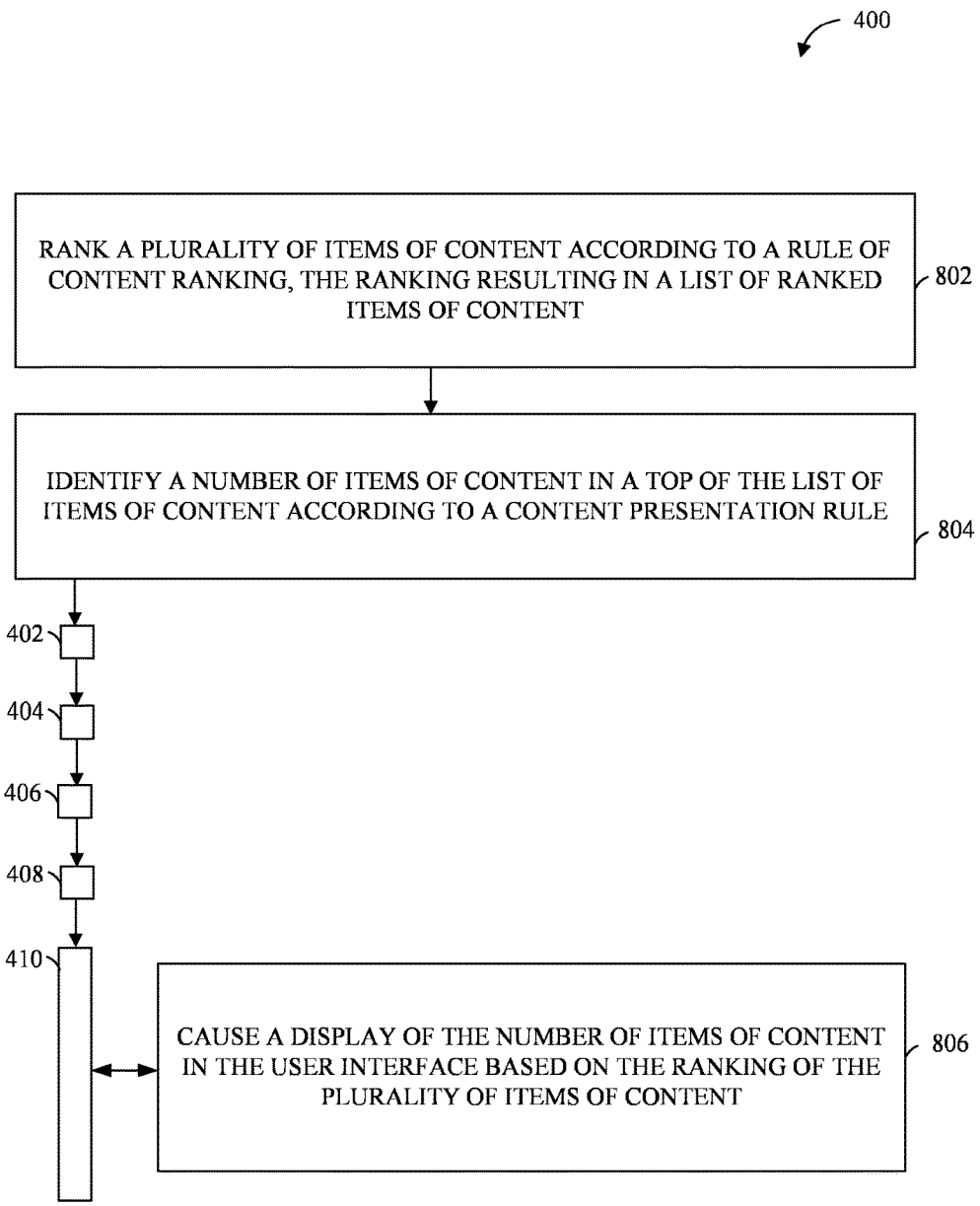
FIG. 8 is a flowchart illustrating a method of personalization of content presented to a member of the SNS visiting a web site, and represents step 410 of the method illustrated in FIG. 4 in more detail and additional steps of the method illustrated in FIG. 4, according to some example embodiments.

As shown in FIG. 8, the method 400 may include method operations 802, 804, and 806, according to some example embodiments. Method operation 802 may be performed before method operation 402, in which the access module 302 accesses (e.g., receives) a member identifier associated with a visitor to a web site. At method operation 802, the ranking module 316 ranks a plurality of items of content including the item of content according to a rule of content ranking. The ranking results in a list of ranked items of content.

Method operation 804 is performed after method operation 802. At method operation 804, the ranking module 316 identifies a number of items of content in a top of the list of items of content according to a content presentation rule.

Method operation 806 may be performed as part (e.g., a precursor task, a subroutine, or a portion) of method operation 410, in which the content presentation module 308 causes presentation of the item of content in a user interface of a widget included in the web site. At method operation 806, the content presentation module 308 causes a display of the number of items of content in the user interface based on the ranking of the plurality of items of content.

Figure 9:
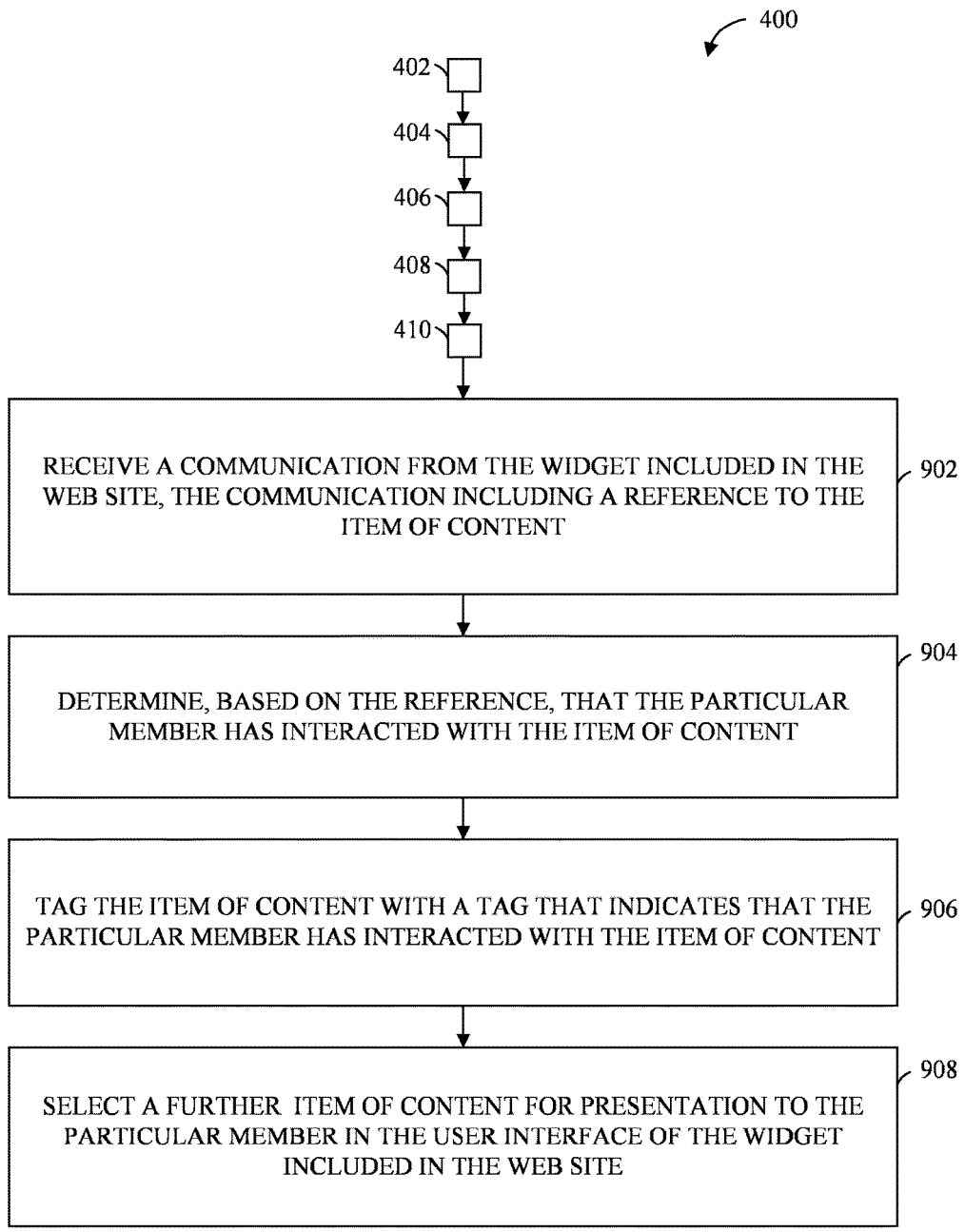
FIG. 9 is a flowchart illustrating a method of personalization of content presented to a member of the SNS visiting a web site, and represents additional steps of the method illustrated in FIG. 4, according to some example embodiments.

As shown in FIG. 9, the method 400 may include method operations 902, 904, 906, and 908, according to some example embodiments. Method operation 902 may be performed after method operation 410, in which the content presentation module 308 causes presentation of the item of content in a user interface of a widget included in the web site. At method operation 902, the content categorization module 312 receives a communication from the widget included in the web site. The communication may include a reference to the item of content.

At method operation 904, the content categorization module 312 determines that the particular member has interacted with the item of content. The determining may be based on the reference to the item of content.

At method operation 906, the content categorization module 312 tags the item of content with a tag that indicates that the particular member has interacted with the item of content. In some example embodiments, the content categorization module 312 tags the item of content with a further tag that indicates that the item of content should not be presented to the particular member in the user interface of the widget again.

At method operation 908, the content selection module 306 selects a further item of content for presentation to the particular member in the user interface of the widget included in the web site.

Example Mobile Device

Figure 10:
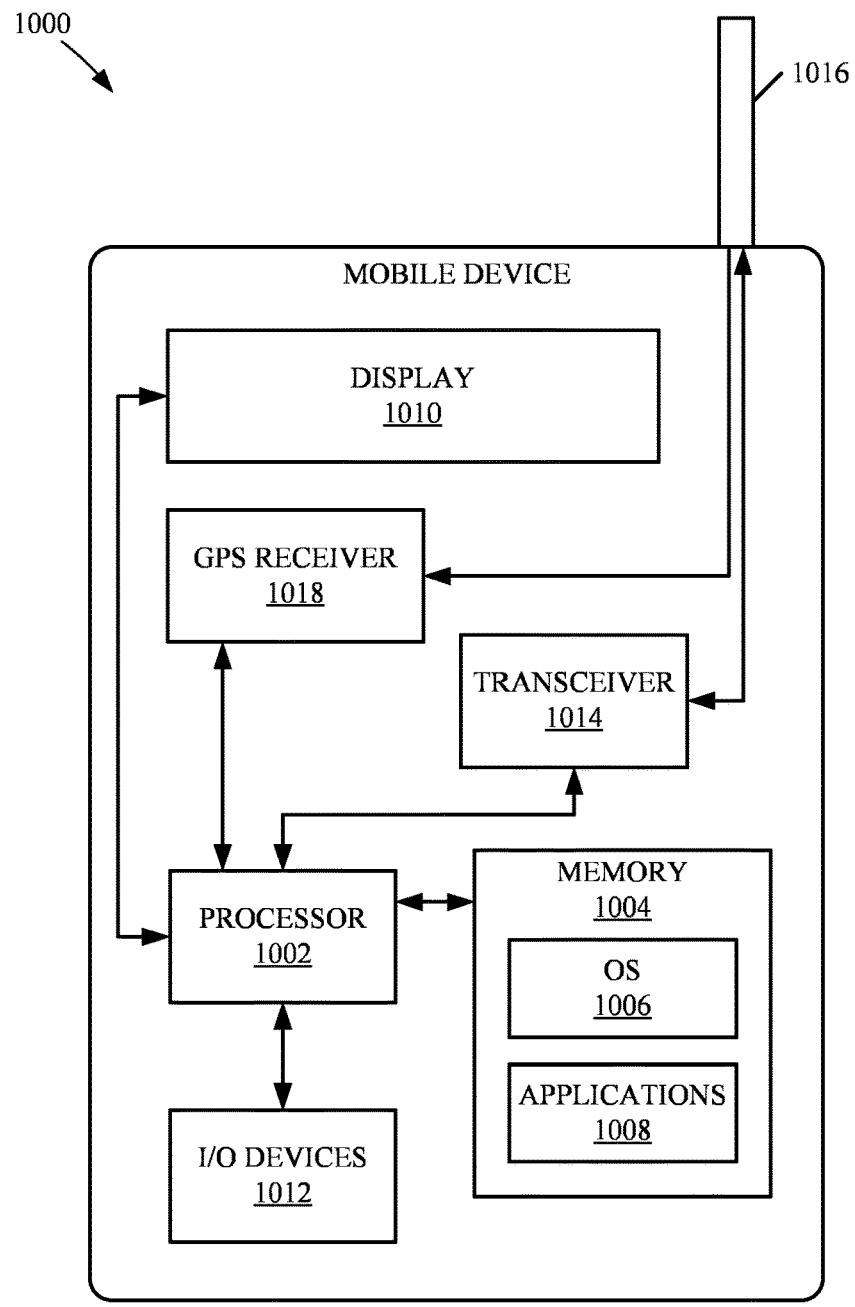
FIG. 10 is a block diagram illustrating a mobile device, according to some example embodiments.

FIG. 10 is a block diagram illustrating a mobile device 1000, according to an example embodiment. The mobile device 1000 may include a processor 1002. The processor 1002 may be any of a variety of different types of commercially available processors 1002 suitable for mobile devices 1000 (for example, an XScale architecture microprocessor, a microprocessor without interlocked pipeline stages (MIPS) architecture processor, or another type of processor 1002). A memory 1004, such as a random access memory (RAM), a flash memory, or other type of memory, is typically accessible to the processor 1002. The memory 1004 may be adapted to store an operating system (OS)

1006, as well as application programs 1008, such as a mobile location enabled application that may provide LBSs to a user. The processor 1002 may be coupled, either directly or via appropriate intermediary hardware, to a display 1010 and to one or more input/output (I/O) devices 1012, such as a keypad, a touch panel sensor, a microphone, and the like. Similarly, in some embodiments, the processor 1002 may be coupled to a transceiver 1014 that interfaces with an antenna 1016. The transceiver 1014 may be configured to both transmit and receive cellular network signals, wireless data signals, or other types of signals via the antenna 1016, depending on the nature of the mobile device 1000. Further, in some configurations, a GPS receiver 1018 may also make use of the antenna 1016 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some example embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 11:
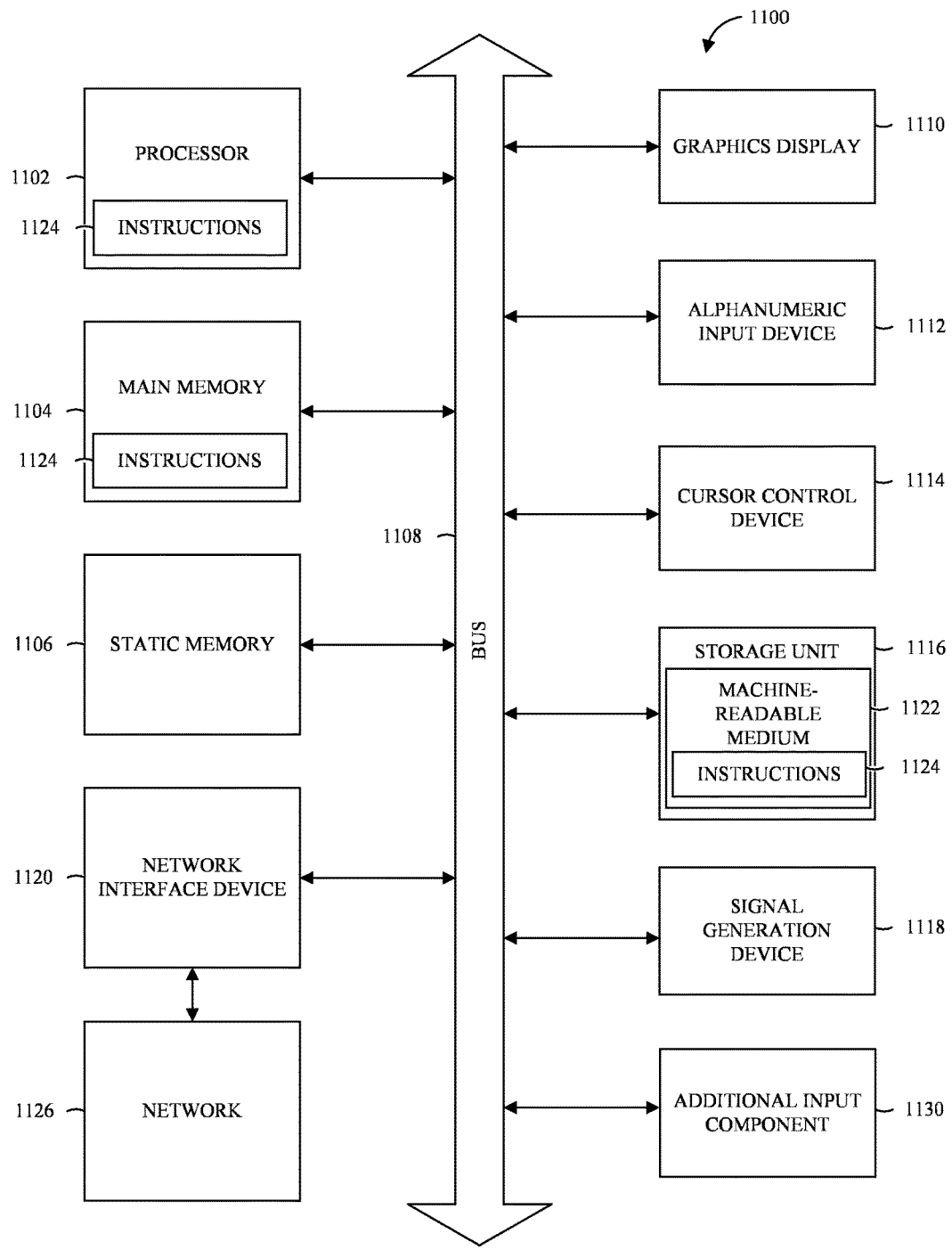
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read instructions 1124 from a machine-readable medium 1122 (e.g., a non-transitory machine-readable medium, a machine-readable storage medium, a computer-readable storage medium, or any suitable combination thereof) and perform any one or more of the methodologies discussed herein, in whole or in part. Specifically, FIG. 11 shows the machine 1100 in the example form of a computer system (e.g., a computer) within which the instructions 1124 (e.g., software, a program, an application, an applet, an app, or other executable code) for causing the machine 1100 to perform any one or more of the methodologies discussed herein may be executed, in whole or in part.

In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include any collection of machines that individually or jointly execute the instructions 1124 to perform all or part of any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The machine 1100 may further include a graphics display 1110 (e.g., a plasma display panel (PDP), a light emitting diode (LED) display, a liquid crystal display (LCD), a projector, a cathode ray tube (CRT), or any other display capable of displaying graphics or video). The machine 1100 may also include an alphanumeric input device 1112 (e.g., a keyboard or keypad), a cursor control device 1114 (e.g., a mouse, a touchpad, a trackball, a joystick, a motion sensor, an eye tracking device, or other pointing instrument), a storage unit 1116, an audio generation device 1118 (e.g., a sound card, an amplifier, a speaker, a headphone jack, or any suitable combination thereof), and a network interface device 1120.

The storage unit 1116 includes the machine-readable medium 1122 (e.g., a tangible and non-transitory machine-readable storage medium) on which are stored the instructions 1124 embodying any one or more of the methodologies or functions described herein. The instructions 1124 may also reside, completely or at least partially, within the main memory 1104, within the processor 1102 (e.g., within the processor's cache memory), or both, before or during execution thereof by the machine 1100. Accordingly, the main memory 1104 and the processor 1102 may be considered machine-readable media (e.g., tangible and non-transitory machine-readable media). The instructions 1124 may be transmitted or received over the network 1126 via the network interface device 1120. For example, the network interface device 1120 may communicate the instructions 1124 using any one or more transfer protocols (e.g., hypertext transfer protocol (HTTP)).

In some example embodiments, the machine 1100 may be a portable computing device, such as a smart phone or tablet computer, and have one or more additional input components 1130 (e.g., sensors or gauges). Examples of such input components 1130 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1124 for execution by the machine 1100, such that the instructions 1124, when executed by one or more processors of the machine 1100 (e.g., processor 1102), cause the machine 1100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
at a content personalization system, identifying a hash value based on a communication received from a third party web server;
identifying, based on the hash value, a member identifier associated with a visitor to a web site associated with the third party web server, the member identifier identifying a particular member of a social networking service;
accessing member data associated with the member identifier in a record of a database associated with the social networking service, the member data including attribute data that is associated with one or more members of the social networking service, the attribute data being represented as name-value pairs;
identifying, using one or more hardware processors, one or more attributes associated with the particular member based on one or more name-value pairs representing the one or more attributes associated with the particular member in the member data;
selecting, at a content personalization system, an item of content for presentation to the particular member, the selecting being based on the one or more attributes associated with the particular member;
generating, at the content personalization system, a widget for inclusion in the web site associated with the third party web server; and
causing, by the content personalization system, inclusion of the widget in the web site at a time of display of the web site in a browser of the client device associated with the particular member, the inclusion of the widget improving the web site based on presenting the item of content in a user interface of the widget included in the web site.

2. The method of claim 1, further comprising:
receiving the communication from the third party web server, the communication including a cookie, the cookie including the hash value;
identifying the hash value included in the cookie;
accessing member data associated with the one or more members of the social networking service; and
matching the hash value to the member identifier that identifies the particular member of the social networking service based on the member data associated with the one or more members.

3. The method of claim 2, wherein the communication received from the third party web server further includes an indication of a particular web page of the web site being viewed by the particular member, and wherein the selecting of the item of content for presentation to the particular member is further based on the particular web page.

4. The method of claim 1, wherein the member data includes at least one of profile data, social graph data, or member activity and behavior data.

5. The method of claim 1, wherein the identifying of the one or more attributes associated with the particular member is performed according to a rule of attribute identification.

6. The method of claim 1, wherein the selecting of the item of content for presentation to the particular member visiting the web site is performed according to a rule of content selection.

7. The method of claim 1, further comprising:
accessing one or more items of content including the item of content; and
categorizing the one or more items of content into one or more categories of content items based on one or more profile criteria associated with members of the social network service and one or more firmographics criteria associated with a company.

8. The method of claim 7, wherein the categorizing of the one or more items of content includes:
identifying a rule of content tagging for tagging the one or more items of content; and
tagging the one or more items of content according to the rule of content tagging, the tagging resulting in one or more tags being associated with the one or more items of content.

9. The method of claim 1, further comprising:
ranking a plurality of items of content including the item of content according to a rule of content ranking, the ranking resulting in a list of ranked items of content;
identifying a number of items of content in a top of the list of items of content according to a content presentation rule, and
wherein the presenting of the item of content in the user interface includes causing display of the number of items of content in the user interface based on the ranking of the plurality of items of content.

10. The method of claim 1, further comprising:
receiving a further communication from the widget included in the web site, the communication including a reference to the item of content;
determining, based on the reference to the item of content, that the particular member has interacted with the item of content;
tagging the item of content with a tag that indicates that the particular member has interacted with the item of content; and
selecting a further item of content for presentation to the particular member in the user interface of the widget included in the web site.

11. A system comprising:
a non-transitory machine-readable medium for storing instructions that, when executed by one or more hardware processors of a machine, cause the machine to perform operations comprising:
at a content personalization system, identifying a hash value based on a communication received from a third party web server;
identifying, based on the hash value, a member identifier associated with a visitor to a web site associated with the third party web server, the member identifier identifying a particular member of a social networking service;
accessing member data associated with the member identifier in a record of a database associated with the social networking service, the member data including attribute data that is associated with one or more members of the social networking service, the attribute data being represented as name-value pairs;

identifying one or more attributes associated with the particular member based on one or more name-value pairs representing the one or more attributes associated with the particular member in the member data;

selecting, at a content personalization system, an item of content for presentation to the particular member, the selecting being based on the one or more attributes associated with the particular member;

generating, at the content personalization system, a widget for inclusion in the web site associated with the third party web server; and causing, by the content personalization system, inclusion of the widget in the web site at a time of display of the web site in a browser of the client device associated with the particular member, the inclusion of the widget improving the web site based on presenting the item of content in a user interface of the widget included in the web site.

12. The system of claim 11, wherein the operations further comprise:
receiving the communication from the third party web server, the communication including a cookie, the cookie including the hash value;
identifying the hash value included in the cookie;
accessing member data associated with the one or more members of the social networking service; and
matching the hash value to the member identifier that identifies the particular member of the social networking service based on the member data associated with the one or more members.

13. The system of claim 12, wherein the communication received from the third party web server further includes an indication of a particular web page of the web site being viewed by the particular member, and wherein the selecting of the item of content for presentation to the particular member is further based on the particular web page.

14. The system of claim 11, wherein the member data includes at least one of profile data, social graph data, or member activity and behavior data.

15. The system of claim 11, wherein the identifying of the one or more attributes associated with the particular member is performed according to a rule of attribute identification.

16. The system of claim 11, wherein the selecting of the item of content for presentation to the particular member visiting the web site is performed according to a rule of content selection.

17. The system of claim 11, wherein the operations further comprise:
accessing one or more items of content including the item of content; and
categorizing the one or more items of content into one or more categories of content items based on one or more profile criteria associated with members of the social network service and one or more firmographics criteria associated with a company.

18. The system of claim 17, wherein the categorizing of the one or more items of content includes:
identifying a rule of content tagging for tagging the one or more items of content; and
tagging the one or more items of content according to the rule of content tagging, the tagging resulting in one or more tags being associated with the one or more items of content.

19. The system of claim 11, wherein the operations further comprise:
ranking a plurality of items of content including the item of content according to a rule of content ranking, the ranking resulting in a list of ranked items of content; and
identifying a number of items of content in a top of the list of items of content according to a content presentation rule,
wherein the presenting of the item of content in the user interface includes causing display of the number of items of content in the user interface based on the ranking of the plurality of items of content.

20. A non-transitory machine-readable storage medium comprising instructions that, when executed by one or more hardware processors of a machine, cause the machine to perform operations comprising:
at a content personalization system, identifying a hash value based on a communication received from a third party web server;
identifying, based on the hash value, a member identifier associated with a visitor to a web site associated with the third party web server, the member identifier identifying a particular member of a social networking service;
accessing member data associated with the member identifier in a record of a database associated with the social networking service, the member data including attribute data that is associated with one or more members of the social networking service, the attribute data being represented as name-value pairs;
identifying one or more attributes associated with the particular member based on one or more name-value pairs representing the one or more attributes associated with the particular member in the member data;
selecting, at a content personalization system, an item of content for presentation to the particular member, the selecting being based on the one or more attributes associated with the particular member;
generating, at the content personalization system, a widget for inclusion in the web site associated with the third party web server; and
causing, by the content personalization system, inclusion of the widget in the web site at a time of display of the web site in a browser of the client device associated with the particular member, the inclusion of the widget improving the web site based on presenting the item of content in a user interface of the widget included in the web site.

* * * * *